US010433040B2

(12) United States Patent
Huang et al.

(10) Patent No.: US 10,433,040 B2
(45) Date of Patent: Oct. 1, 2019

(54) LOUDSPEAKER

(71) Applicant: Premium Loudspeakers (Hui Zhou) Co., Ltd., Huizhou, Guangdong Province (CN)

(72) Inventors: Wen-An Huang, Huizhou (CN); Yi-Ming Wu, Huizhou (CN)

(73) Assignee: TYMPHANY ACOUSTIC TECHNOLOGY (HUIZHOU) CO., LTD., Huizhou, Guangdong Province (CN)

( * ) Notice: Subject to any disclaimer, the term of this patent is extended or adjusted under 35 U.S.C. 154(b) by 0 days.

(21) Appl. No.: 16/100,663

(22) Filed: Aug. 10, 2018

(65) Prior Publication Data

US 2019/0052943 A1    Feb. 14, 2019

(30) Foreign Application Priority Data

Aug. 10, 2017    (CN) .................... 2017 1 0681113.6

(51) Int. Cl.
| *H04R 1/02* | (2006.01) |
| *H04R 1/28* | (2006.01) |
| *H04R 5/02* | (2006.01) |
| *F16C 11/04* | (2006.01) |
| *H04R 1/26* | (2006.01) |

(52) U.S. Cl.
CPC ........... *H04R 1/025* (2013.01); *H04R 1/2803* (2013.01); *H04R 5/02* (2013.01); *F16C 11/04* (2013.01); *H04R 1/26* (2013.01); *H04R 2201/025* (2013.01); *H04R 2205/024* (2013.01); *H04R 2420/07* (2013.01)

(58) Field of Classification Search
CPC ........ H04R 1/025; H04R 1/26; H04R 1/2803; H04R 5/02; H04R 2201/025; H04R 2205/024; H04R 2420/07; F16C 11/04
See application file for complete search history.

(56) References Cited

U.S. PATENT DOCUMENTS

| 4,450,495 A * | 5/1984 | Naruki ..................... H04R 5/02 381/334 |
| 7,058,194 B2 * | 6/2006 | Jeon ........................ H04M 1/05 381/375 |

* cited by examiner

*Primary Examiner* — Brian Ensey
(74) *Attorney, Agent, or Firm* — Muncy, Geissler, Olds & Lowe, P.C.

(57) ABSTRACT

A loudspeaker includes a first sound box, a second sound box, and a connection shaft. The first sound box includes at least one first speaker unit. The second sound box includes at least one second speaker unit. The connection shaft includes a cylinder, at least one first guide ring, and at least one second guide ring. The first guide ring is electrically sleeved on the cylinder and connected to the first speaker unit. The second guide ring is electrically connected to the second speaker unit. The first guide ring and the second guide ring correspond to each other and are electrically connected to each other, so that the first sound box and the second sound box are electrically connected to each other. The first sound box may rotate freely, about the connection shaft, with respect to the second sound box.

10 Claims, 5 Drawing Sheets

LOUDSPEAKER

CROSS REFERENCE TO RELATED APPLICATIONS

This application claims priority to CN 201710681113.6, which was filed on Aug. 10, 2017, and which is herein incorporated by reference.

BACKGROUND

Technical Field

This application relates to a loudspeaker, and in particular, to a loudspeaker in which sound boxes can be rotated, moved and adjusted.

Related Art

In an audio/video entertaining scenario using loudspeakers, several sound boxes are usually placed at different locations (connecting by wiring), so as to render a multichannel stereophonic sound effect. Large sound boxes may be arranged at different positions to achieve the multichannel stereophonic sound effect. However, if small sound boxes having a small volume are arranged separately, it may be difficult to find the sound boxes because they are blocked by other objects or tucked in a corner.

SUMMARY

In view of this, this application provides a loudspeaker, which includes a first sound box, a second sound box, and a connection shaft. The first sound box includes at least one first speaker unit. The second sound box includes at least one second speaker unit. The connection shaft includes a cylinder, at least one first guide ring, and at least one second guide ring. The at least one first guide ring is electrically sleeved on the cylinder and connected to the first speaker unit. The at least one second guide ring is electrically connected to the second speaker unit. The at least one first guide ring and the at least one second guide ring correspond to each other and are electrically connected to each other, so that the first sound box and the second sound box are electrically connected to each other. The first sound box may rotate and move freely, by means of the connection shaft, with respect to the second sound box.

The first sound box moves freely, according to different environments and spaces, with respect to the second sound box.

In an embodiment, the cylinder extends from the first sound box, and the at least one first guide ring is provided on the cylinder directly by coating. The at least one second sound box includes a groove, and the second guide ring is provided on an inner surface of the groove. The groove and the cylinder correspond to each other. When the cylinder is located in the groove, the first guide ring and the second guide ring are electrically connected to each other.

In another embodiment, the second sound box does not include a groove, and the first guide ring extends from the first sound box. The second guide ring extends from the second sound box. The at least one first guide ring and the at least one second guide ring are both sleeved on the cylinder, correspond to each other, and are electrically connected to each other.

In a third embodiment, the at least one first guide ring extends from the first sound box, and is sleeved on the cylinder. The second sound box includes a groove, and the at least one second guide ring is provided on an inner surface of the groove. The groove and the cylinder correspond to each other, and when the cylinder is located in the groove, the at least one first guide ring and the at least one second guide ring are electrically connected to each other.

According to this application, at least two sound boxes can be connected by the connection shaft, and the sound boxes can be rotated towards different directions, so that a user can adjust the sound boxes to desired positions, thereby achieving the multichannel stereophonic sound effect. Moreover, compared with the loudspeaker having multi-single sound box, on the whole, the loudspeaker having more than two sound boxes connected by the connection shaft is easy to be arranged at correct positions.

BRIEF DESCRIPTION OF THE DRAWINGS

This application will become more fully understood from the detailed description given herein below for illustration only, and thus are not limitative of this application, and wherein.

DETAILED DESCRIPTION

Figure 1:
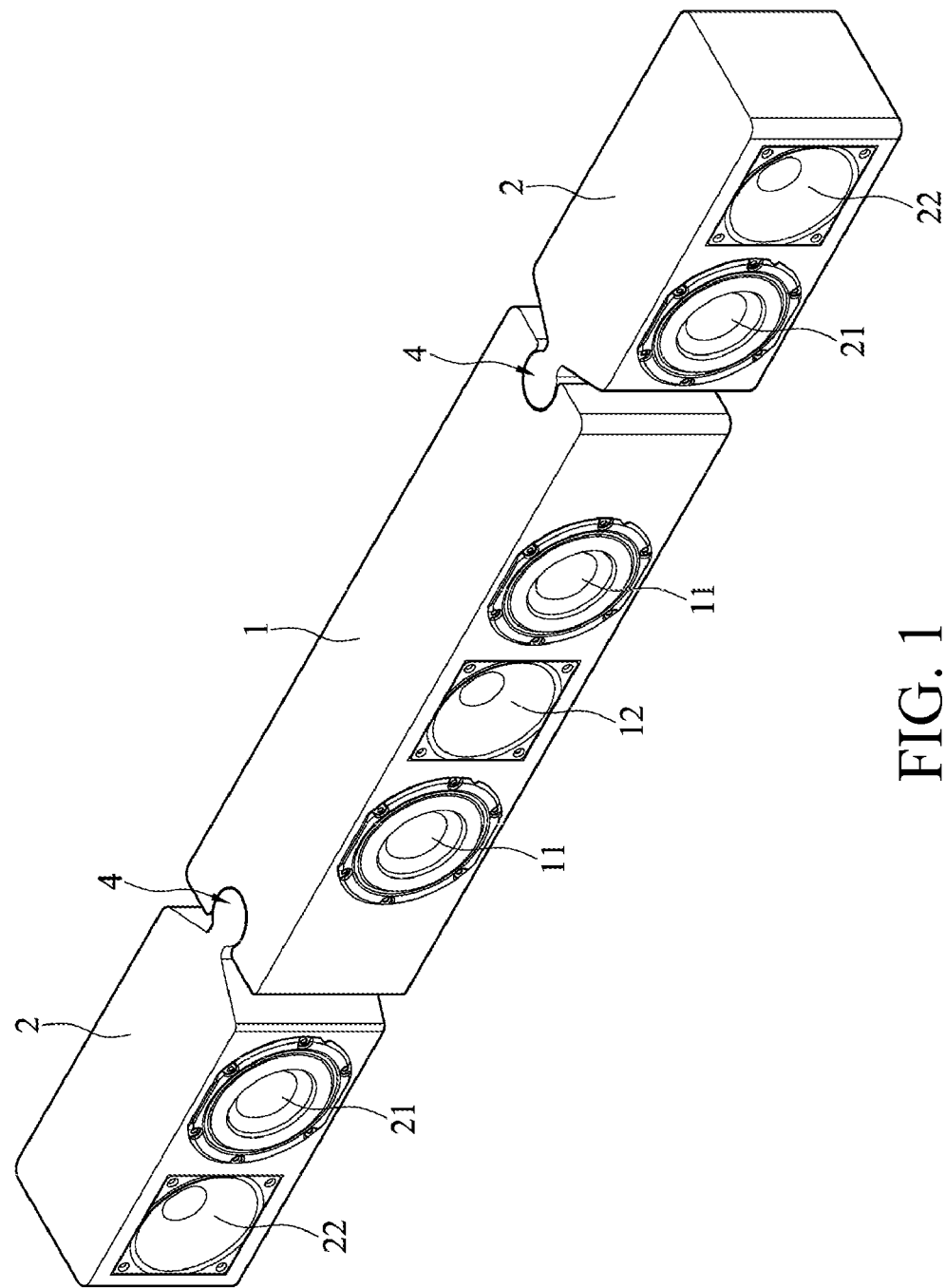
FIG. 1 is a schematic perspective view of an embodiment of a loudspeaker according to this application.

Referring to FIG. 1, this application provides a loudspeaker, which includes a first sound box 2, a second sound box 1, and a connection shaft 4. The first sound box 2 includes at least one first speaker unit 21. To achieve a better acoustic effect, the first sound box 2 may include multiple speaker units, for example, a woofer 21 and a tweeter 22. However, this is illustrative only and is not intended to limit this application. The multiple speaker units may also include a squawker (not shown). The second sound box 1 includes at least one second speaker unit 11. Similarly, the second sound box 1 may also include multiple speaker units, for example, two woofers 11 and a tweeter 12. However, this is illustrative only and is not intended to limit this application. The multiple speaker units may also include a squawker. Moreover, two first sound boxes 2 may be provided and separately arranged on the left and right sides of the second sound box 1 by using two connection shafts 4.

Figure 2:
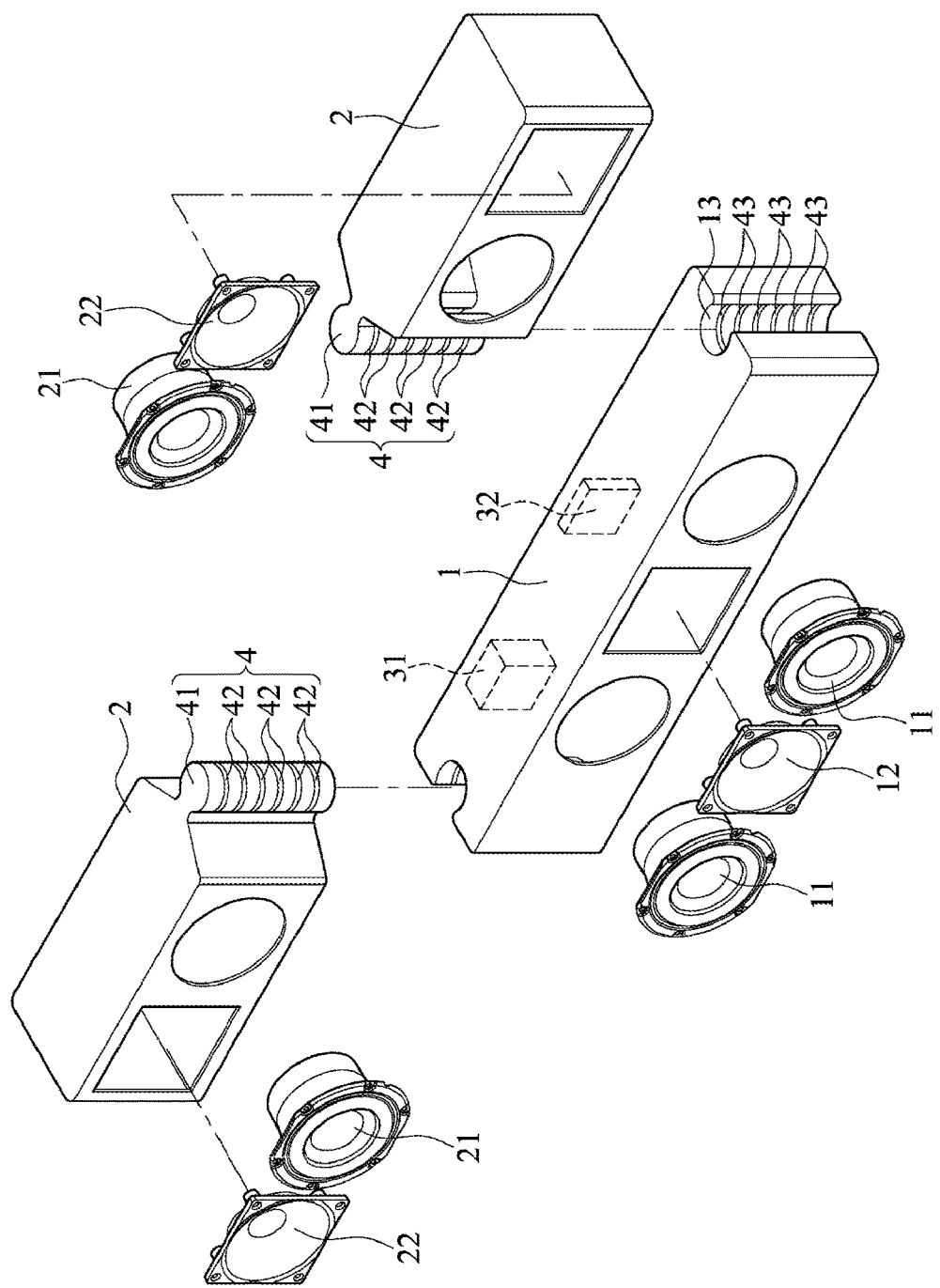
FIG. 2 is a schematic exploded perspective view according to FIG. 1.

Referring to FIG. 2, each of the connection shafts includes a cylinder 41, at least one first guide ring 42, and at least one second guide ring 43. The at least one first guide ring 42 is electrically sleeved on the cylinder 41 and electrically connected to the speaker unit 21 and/or 22. The at least one second guide ring 43 is electrically connected to the speaker unit 11 and/or 12. The at least one first guide ring 42 and the at least one second guide ring 43 correspond to each other and are electrically connected to each other, so that the first sound box 2 (or the two first sound boxes 2) and the second sound box 1 are electrically connected to each other. The (two) first sound box(es) 2 may rotate and move freely, by means of the (two) connection shaft(s) 4, with respect to the second sound box 1.

Further, in an embodiment of FIG. 2, the cylinder 41 extends from the first sound box 2, that is, the cylinder 41 is an extension of the housing of the first sound box 2. Accordingly, when there are two first sound boxes 2, two cylinders 41 are provided. The at least one first guide ring 42 is directly coated on each cylinder 41. The second sound box 1 includes a groove 13, and the at least one second guide ring 43 is provided on an inner surface of the groove 13. The groove 13 and the cylinder 41 correspond to each other. If there are two first sound boxes 2, two grooves 13 are provided. When the cylinder 41 is located in the groove 13, the at least one first guide ring 42 and the at least one second guide ring 43 are electrically connected to each other, and the (two) first sound box(es) 2 may rotate and move freely with respect to the second sound box 1. The first sound box 2 may also be designed so that a side wall next to the cylinder 41 is an oblique surface (as shown in FIG. 2) or an arc (not shown), thereby facilitating rotation and movement. Alternatively, the second sound box 1 may also be designed so that that a side wall next to the groove 13 is an oblique surface (not shown) or an arc (not shown), thereby facilitating rotation and movement.

In addition, the loudspeaker may further include a battery 31 and a wireless module 32, which are electrically connected to the speaker unit 11, 12, 21 and/or 22. If the loudspeaker is not connected to power by an electric wire, the battery 31 may provide the power. The wireless module 32 may receive a wireless signal, so as to control the speaker unit 11, 12, 21 and/or 22 to produce sound according to the wireless signal.

Figure 3:
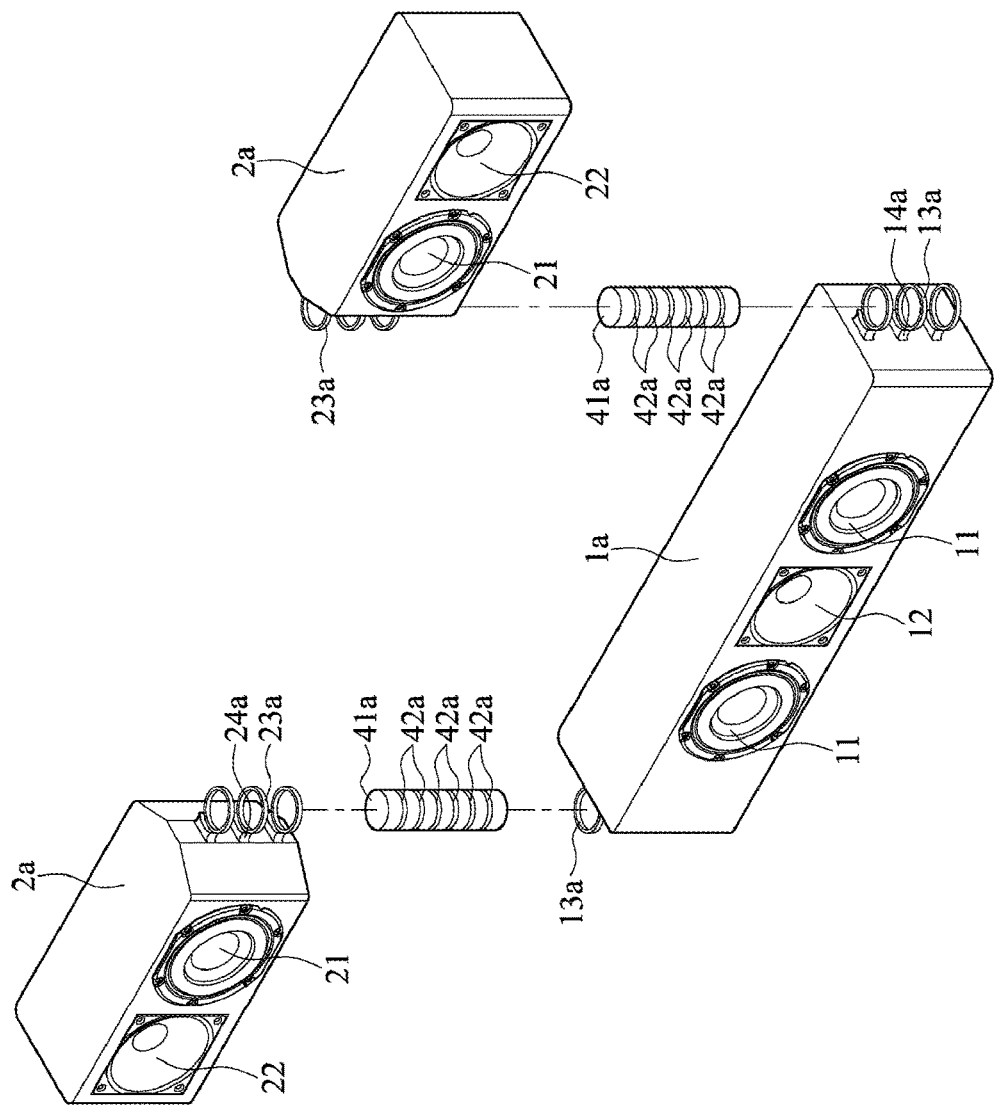
FIG. 3 is a schematic perspective exploded view of another embodiment of a loudspeaker according to this application.

FIG. 3 illustrates another embodiment. A cylinder 41a of the connection shaft is provided independently, and a second sound box 1a does not include a groove. When there are two first sound boxes 2a, two cylinders 41a may be provided. In this embodiment, at least one first guide ring 23a extends from each of first sound boxes 2a, and at least one second guide ring 13a extends from the second sound box 1a. The at least one first guide ring 23a and the at least one second guide ring 13a are both sleeved on the cylinder 41a, correspond to each other, and are electrically connected to each other. In this embodiment, the cylinder 41a is provided with a slot 42a, and the at least one first guide ring 23a and the at least one second guide ring 13a are embedded in the slot 42a, so as to achieve a firmer connection. In addition, the at least one first guide ring 23a and the at least one second guide ring 13a are respectively connected to an extension part 24a of each first sound box 2a and an extension part 14a of the second sound box 1a, so as to strengthen the structure. Similar to the first embodiment, the (two) first sound box(es) 2a and/or the second sound box 1a may also be designed so that side walls that face each other are oblique surfaces or arc (not shown), thereby facilitating rotation and movement.

According to the embodiments of FIG. 2 and FIG. 3, this application may further include different variation embodiments. For example, as shown in FIG. 3, the at least one first guide ring 23a extends from the (two) first sound box(es) 2a and is sleeved on the (two) cylinder(s) 41a; and as shown in FIG. 2, the second sound box 1a may include a groove 13, and the at least one second guide ring 43 is provided on an inner surface of the groove 13. The groove 13 and the cylinder 41a still correspond to each other, and when the cylinder 41a is located in the groove 13, the first guide ring 23a and the second guide ring 43 are electrically connected to each other. Though this variation embodiment is not shown in figures, those skilled in the art can easily think of this variation embodiment after reading FIG. 1 to FIG. 3 and the specification.

Figure 4:
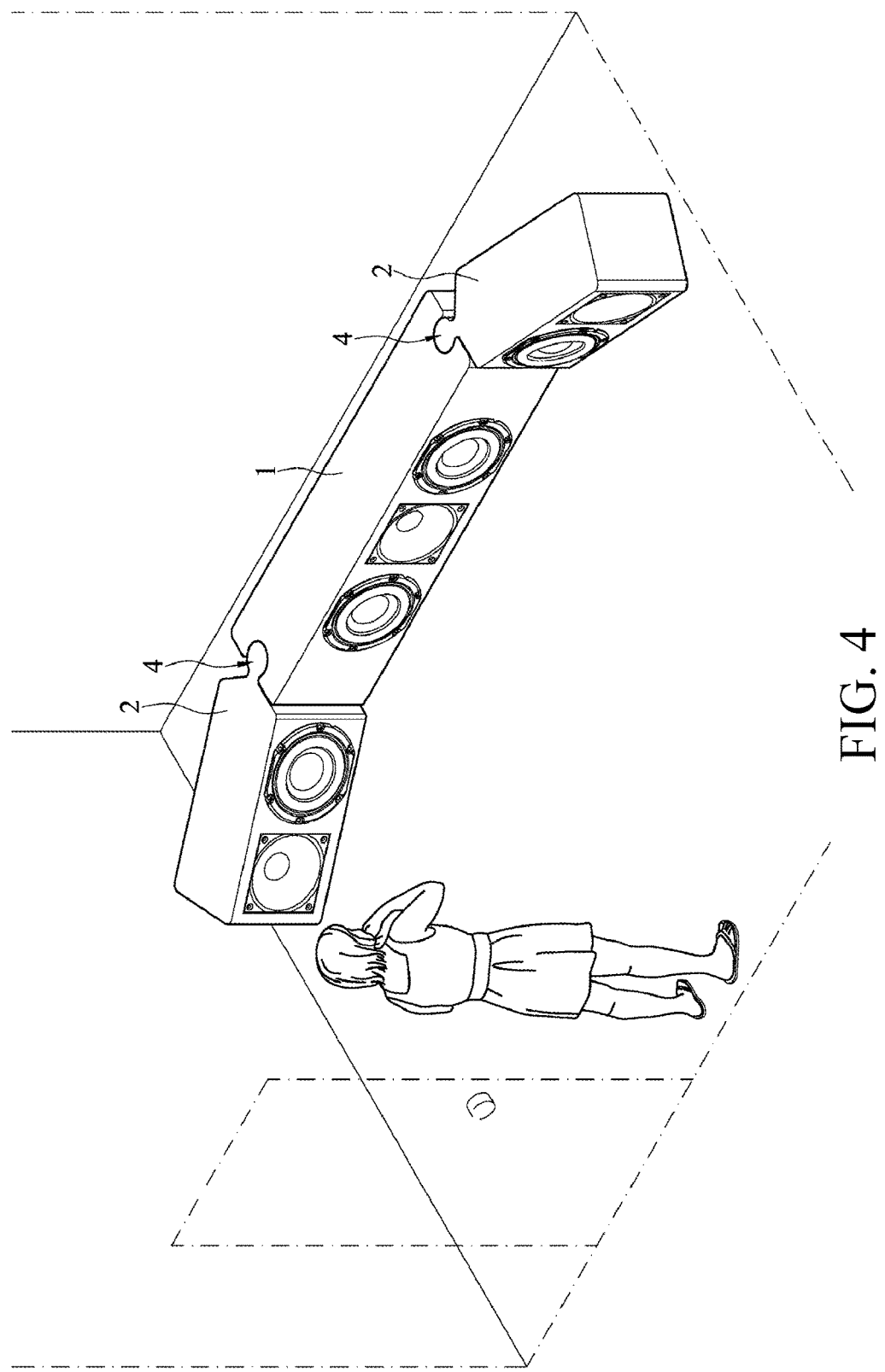
FIG. 4 is a reference diagram of the embodiment according to FIG. 1 in use state.
Figure 5:
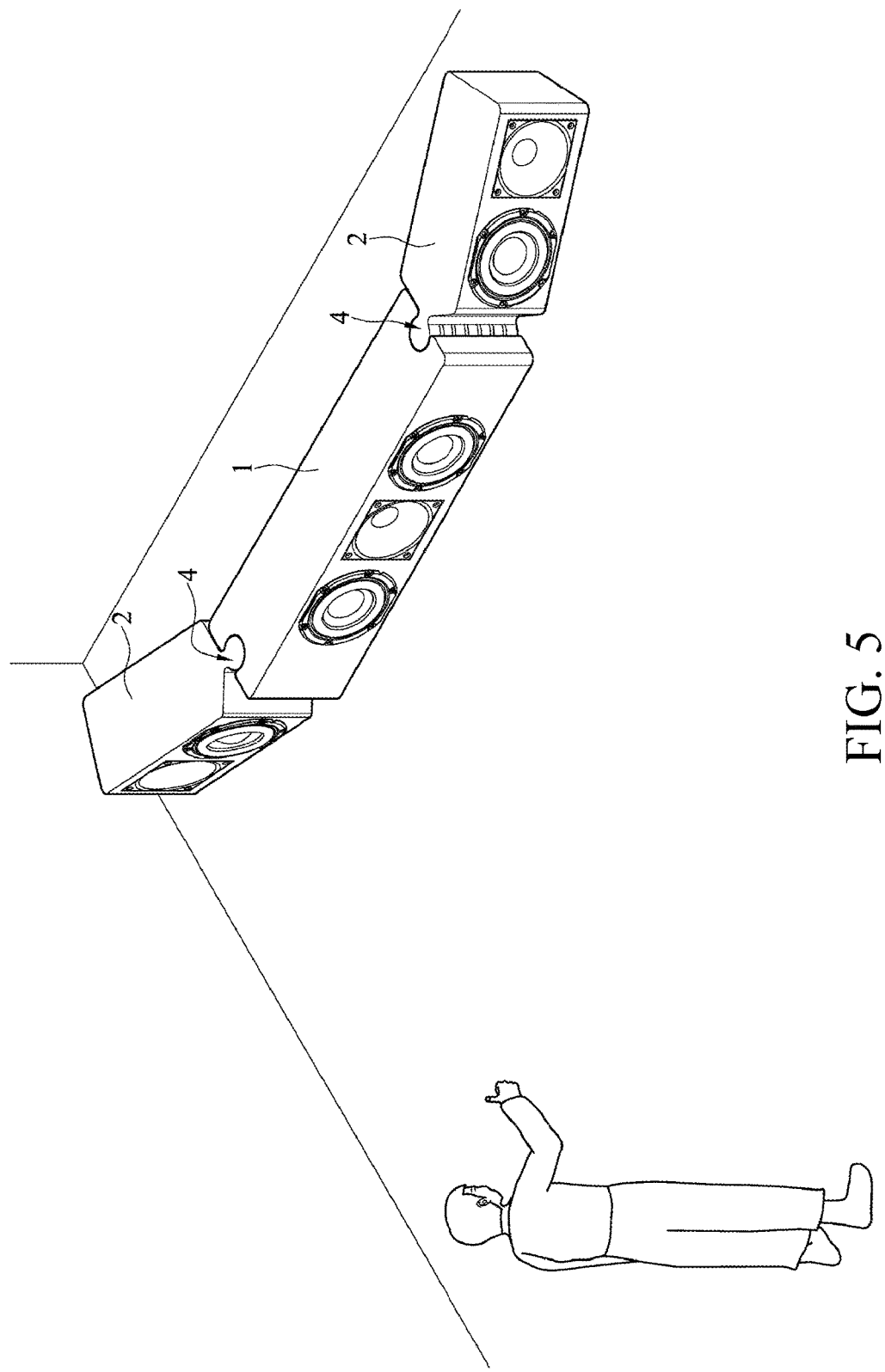
FIG. 5 is a reference diagram of the embodiment according to FIG. 1 in use state.

FIG. 4 and FIG. 5 show two different use states of the loudspeaker in this application. According to different needs, a user may adjust the angle of the sound boxes, so as to achieve different hearing effects. For example, FIG. 4 shows that the sound boxes may be adjusted towards a user in a small environment and space. In a large environment and space, as shown in FIG. 5, the sound boxes may be adjusted backwards (a direction opposite to the user). The user may enjoy the best hearing effect. This is not intended to limit this application, and the loudspeaker in this application may also be placed on a desk when small sound boxes are used.

In conclusion, in the loudspeaker according to this application, at least two sound boxes can be connected by one connection shaft, and the sound boxes can be rotated to make different sound boxes move towards different directions, so that a user can adjust the sound boxes to desired positions, thereby achieving the multichannel stereophonic sound effect. Moreover, compared with a single sound box, on the whole, the loudspeaker having more than two sound boxes connected by the connection shaft is easy to be arranged at correct positions.

Although this application has been disclosed above in the embodiments, they are not intended to limit this application. Any person skilled in the art may vary or modify this application, without departing from the spirit or scope of this application. Therefore, the protection scope of this application is defined by the appended claims.

What is claimed is:

1. A loudspeaker, comprising:
   a first sound box, comprising at least one first speaker unit;
   a second sound box, comprising at least one second speaker unit; and
   a connection shaft, comprising:
     a cylinder;
     at least one first guide ring, sleeved on the cylinder and electrically connected to the at least one first speaker unit; and
     at least one second guide ring, electrically connected to the at least one second speaker unit,
     wherein the at least one first guide ring and the at least one second guide ring correspond to each other and are electrically connected to each other, so that the first sound box and the second sound box are electrically connected to each other, and the first sound box is configured to rotate freely, about the connection shaft, with respect to the second sound box.

2. The loudspeaker according to claim 1, wherein the cylinder extends from the first sound box, and the at least one first guide ring is provided on the cylinder.

3. The loudspeaker according to claim 1, wherein the second sound box comprises a groove, and the at least one second guide ring is provided on an inner surface of the groove.

4. The loudspeaker according to claim 2, wherein the second sound box comprises a groove, and the at least one second guide ring is provided on an inner surface of the groove.

5. The loudspeaker according to claim 4, wherein the groove and the cylinder correspond to each other, and when the cylinder is located in the groove, the at least one first guide ring and the at least one second guide ring are electrically connected to each other.

6. The loudspeaker according to claim 1, wherein the at least one first guide ring extends from the first sound box.

7. The loudspeaker according to claim 6, wherein the at least one second guide ring extends from the second sound box, and the at least one second guide ring is sleeved on the cylinder, so that the at least one first guide ring and the at least one second guide ring are electrically connected to each other.

8. The loudspeaker according to claim 6, wherein the second sound box comprises a groove, and the at least one second guide ring is provided on an inner surface of the groove; the groove and the cylinder correspond to each other, and when the cylinder is located in the groove, the at least one first guide ring and the at least one second guide ring are electrically connected to each other.

9. The loudspeaker according to claim 1, further comprising a second second sound box and a second connection shaft, wherein two sides of the first sound box are connected to the second sound boxes by the two connection shafts, respectively.

10. The loudspeaker according to claim 1, wherein the first sound box rotates freely, according to different environments and spaces, with respect to the second sound box.

* * * * *